June 24, 1969   D. H. BUERKEL   3,452,211
POLARITY REVERSIBLE CURRENT REGULATOR APPARATUS
Filed March 23, 1967

INVENTOR
DAVID H. BUERKEL
BY Shoemaker and Mattare
ATTORNEYS

United States Patent Office 3,452,211
Patented June 24, 1969

3,452,211
POLARITY REVERSIBLE CURRENT
REGULATOR APPARATUS
David H. Buerkel, Broomall, Pa., assignor to Neoweld Electric Inc., Cornwall Bridge, Conn., a corporation of Connecticut
Filed Mar. 23, 1967, Ser. No. 625,497
Int. Cl. H02j 1/10; H02m 7/02
U.S. Cl. 307—24                 10 Claims

ABSTRACT OF THE DISCLOSURE

A source of DC electric power comprises a pair of rectifier means each having a positive and negative output terminal, the positive output terminal of one of the rectifier means and the negative output terminal of the other of the rectifier means are connected to a common terminal which in turn is adapted to be connected to ground. One or more control means is provided, each control means including selectively adjustable resistance means for varying the current output thereof. Means in the form of a switch or the like is provided for selectively electrically connecting either the positive terminal of one rectifier means or the negative terminal of the other rectifier means to the input of the control means to thereby control the polarity of the output of the control means which is connected with suitable welding apparatus or the like. The apparatus is especially adapted for use in a multi-operator system wherein a plurality of control means are connected as described above in parallel with one another.

Background of the invention

The present invention relates to apparatus for controlling the amperage and polarity of electric current as used for example in welding apparatus, and more particularly to multi-operator welding systems.

In early multi-operator welding systems, the welding outputs were all attached to a source of direct current electric power, and all the outputs operated on the same polarity as the power source. The polarity of a welding output could not be changed unless the polarity of the power source was varied.

Multi-operator units have been provided wherein a plurality of current control means have been mounted on a common frame or rack along with means for varying the polarity of the output current. This type of prior art arrangement employs a common alternating current transformer which in turn is connected in series with individual rectifier means which are connected with the control means. This arrangement actually comprises a group of single-operator welding control means which are simply arranged on a common support means. Additionally, this type of prior art arrangement has employed a reactive electrical circuit which is not as desirable as a resistance type circuit from a welding characteristic standpoint. With this type of prior art arrangement, the number of welders employing the unit is strictly limited since each welding outlet requires its own individual rectifier.

Summary of the invention

In the present invention, the control means is uniquely connected with the DC power source, the control means including selectively adjustable impedance means providing the drooping voltage ampere characteristic necessary for welding.

In a multi-operator welding system according to the present invention, the polarity as well as the amperage of the output of each control means may be changed independently of all other control means thereby affording maximum versatility to the system.

Additionally, a multi-operator welding system according to the present invention takes advantage of a diversity factor since as the number of arcs used in the system increases, the average power consumed per output decreases. This enables a larger number of arcs to be employed with the system and provides an important advantage of the present invention from an economic standpoint.

An object of the present invention is to provide new and novel polarity reversible current regulator apparatus which provides the desired voltage ampere characteristic for welding; and wherein each control means in a multi-operator welding system is independently adjustable of all other control means to vary both the amperage and polarity of the output therefrom; and further wherein the invention takes advantage of a diversity factor in a multi-operator system.

Description of the preferred embodiments

Figure 1:
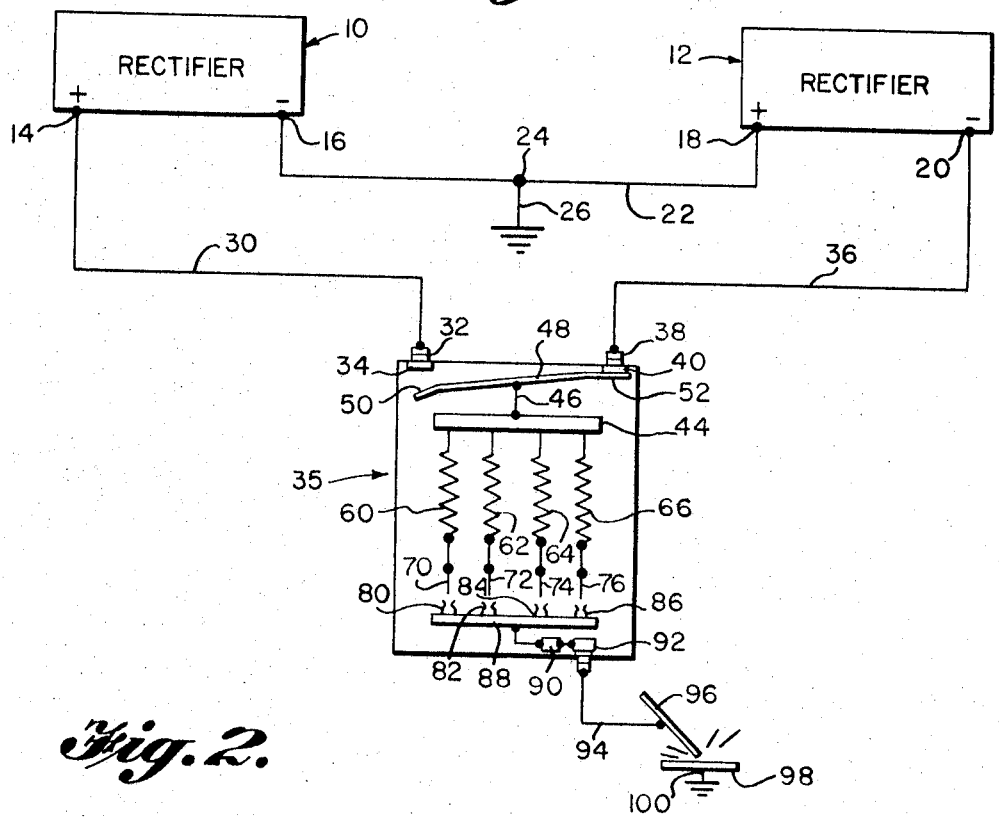
FIG. 1 is a somewhat schematic wiring diagram of apparatus according to the present invention.

Referring now to the drawing, a first form of the invention is illustrated in FIG. 1 wherein a pair of rectifiers 10 and 12 are provided, these rectifiers being suitably connected in a conventional manner with a source of AC electric power. Rectifier 10 includes a positive output terminal 14 and a negative output terminal 16, while rectifier 12 includes a positive output terminal 18 and a negative output terminal 20. While two power sources in the form of a pair of separate rectifiers are illustrated, a single transformer rectifier with dual secondaries may also be utilized.

Negative output terminal 16 and positive output terminal 18 are connected with a common lead 22 which in turn is connected with a common terminal 24 which is adapted to be connected to ground through a lead 26. With this arrangement, a potential of positive polarity is established between terminal 14 and terminal 24, or ground, and a potential of negative polarity is established between terminal 20 and terminal 24 or ground.

Terminal 14 of rectifier 10 is connected by a lead 30 with an electrical connecter means 32 which in turn is connected with a contact 34 provided at one end of a suitable control means indicated generally by reference numeral 35. This control means may be of the type as shown for example in U.S. Patent No. 3,278,835 wherein a plurality of resistance means are adapted to be selectively connected in the circuit for varying the current output from the control means.

Terminal 20 of rectifier 12 is connected by a lead 36 with a connector means 38 which in turn is connected with a contact 40 of the control means 35.

The control means includes an input means in the form of a bus bar 44 which would correspond to the bus bar 73 as shown in the aforementioned U.S. patent. Bus bar 44 is connected by means of lead 46 with a manually operable switch means 48 which is provided with opposite end portions 50 and 52 adapted to engage contacts 34 and 40 respectively. Switch means 48 may be suitably operated either manually, or remotely and automatically if desired, the switch means being illustrated as in the position wherein contact 40 is connected with bus bar 44, it being understood that switch means 48 is adapted to be pivoted into its other operative position wherein the end portion 50 thereof would engage contact 34, while end portion 52 would be spaced from contact 40 to thereby connect contact 34 with bus bar 44 and to disconnect the bus bar from the contact 40.

A plurality of resistors 60, 62, 64 and 66 are connected with bus bar 64 and are also connected with manually operable switch means indicated schematically by reference numerals 70, 72, 74 and 76. These switch means are adapted to engage the spring clip contact members 80, 82, 84 and 86 connected with bus bar 88 of the control means. These resistors, manually operable switch means and spring contact members correspond to similar members illustrated in FIG. 15 of the aforementioned U.S. patent.

Bus bar 88 is in turn connected through a fuse 90 with an output means 92. Output means 92 is connected by lead 94 with a suitable welding rod holder or the like 96. A workpiece is indicated generally by reference numeral 98, the workpiece being connected through lead 100 to ground.

It is apparent that the control means 35 provides not only a means for varying the current output therefrom, but the polarity of the current may be reversed as desired. In the position illustrated in FIG. 1, contact 40 is connected with bus bar 44 so that a potential of negative polarity is established between the welding electrode and the workpiece. If switch 48 is moved to its opposite operative position, a potential of opposite polarity would be established.

Figure 2:
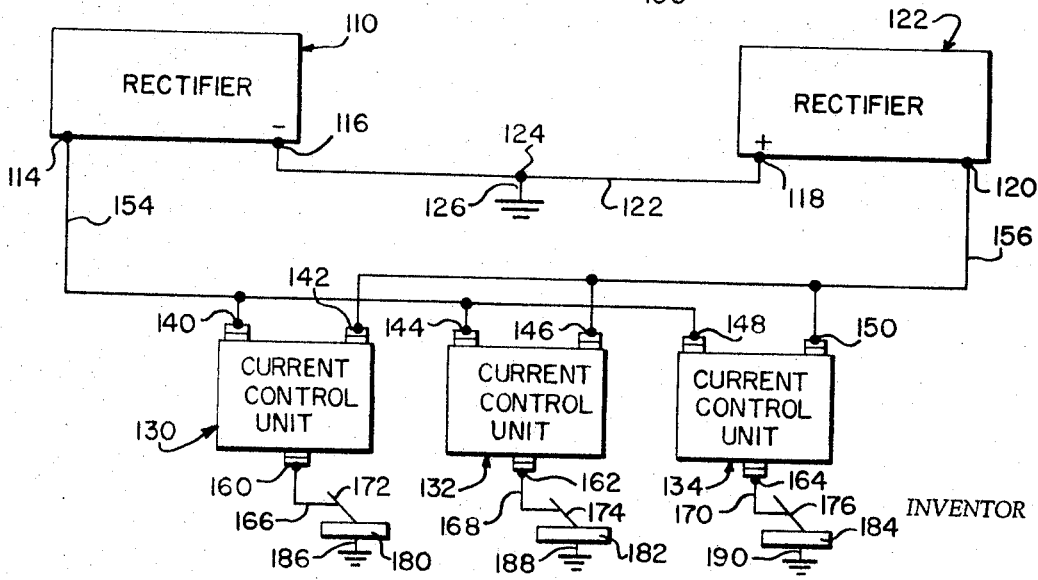
FIG. 2 is a schematic wiring diagram of a multi-operator welding system according to the present invention.

Referring now to FIG. 2 of the drawing, a multi-operator system according to the present invention is illustrated. A pair of rectifiers 110 and 112 corresponding to rectifiers 10 and 12 previously described are provided, these rectifiers being connected with a suitable source of AC electric power. Rectifier 110 is provided with a positive output terminal 114 and a negative output terminal 116, while rectifier 112 is provided with a positive output terminal 118 and a negative output terminal 120. Terminals 116 and 118 are connected with a common lead 122 which is in turn connected with a common terminal 124. Terminal 124 is connected with ground through lead 126.

Three current control units 130, 132 and 134 of substantially identical construction to the control means 35 previously described are provided. Control unit 130 includes electrical connectors 140 and 142; control unit 132 includes electrical connectors 144 and 146; and control unit 134 includes electrical connectors 148 and 150. The pair of electrical connectors associated with each of the control units corresponds to the connectors 32 and 38 previously described.

A lead 154 is connected with terminal 114 of rectifier 110, this lead in turn being connected with the electrical connectors 140, 144 and 148 of control units 130, 132 and 134 respectively. An electric lead 156 is connected with terminal 120 of rectifier 112 and is connected with the electrical connectors 142, 146 and 150 of control units 130, 132 and 134 respectively.

Output means 160, 162 and 164 are provided on the control units 130, 132 and 134 respectively, these output means corresponding to the output means 92 of the previously described embodiment.

Leads 166, 168 and 170 are connected with output means 160, 162 and 164 respectively and are further connected with welding rod holders 172, 174 and 176 respectively.

The welding electrodes 172, 174 and 176 are illustrated as being operatively associated with workpieces 180, 182 and 184 respectively. Leads 186, 188 and 190 serve to ground the workpieces 180, 182 and 184 respectively.

It is apparent that the plurality of current control units in the multi-operator welding system shown in FIG. 2 are connected in parallel with one another with respect to the source of DC electric power. Each of these control units is adapted to be selectively controlled for varying both the current output therefrom as well as the polarity of the output, each of the control units being selectively controllable independently and separately of all of the other control units.

It is apparent that the number of current control units may be selected as desired, and any number of control units may be employed as limited only by the source of power. In this regard, it should also be noted that further rectifiers may be connected in the system so as to enable a larger number of control units to be employed.

It is apparent from the foregoing that there is provided according to the present invention new and novel polarity reversible current regulator apparatus which provides the desired voltage ampere characteristics and wherein the output of each control unit in the multi-operator system may be separately and independently adjustable both as to current and polarity without affecting the operation of any of the other control units, the over-all system taking advantage of the diversity factor in the multi-operator system.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Polarity reversible current regulator apparatus comprising a source of DC electric power, said power source including a first output terminal, a second output terminal and a third output terminal, there being a potential of one polarity between said first output terminal and said third output terminal, there being a potential of opposite polarity between said second output terminal and said third output terminal, control means for controlling the current output therefrom, said control means including input means and output means, and means for selectively electrically connecting either said first output terminal or said second output terminal with the input means of said control means.

2. Apparatus as defined in claim 1 wherein said source of DC electric power comprises a plurality of rectifier means, said rectifier means being interconnected with one another and with said control means.

3. Apparatus as defined in claim 2 wherein each of said rectifier means has a positive output terminal and a negative output terminal, said third terminal being interconnected with the positive terminal of one of said rectifier means and with the negative terminal of the other of said rectifier means.

4. Apparatus as defined in claim 3 where said third terminal is adapted to be connected with ground, the negative output terminal of said one rectifier means being connected with said control means, the positive output terminal of the other of said rectifier means being connected with said control means.

5. Apparatus as defined in claim 1 including a plurality of control means, all of said control means being connected in parallel with said source of DC electric energy.

6. Apparatus as defined in claim 1 wherein said rectifier means comprises a pair of rectifiers, each of said rectifiers having a positive output terminal and a negative output terminal, the positive output terminal of one of said rectifier means and the negative output terminal of the other of said rectifier means being connected with said third output terminal, and a plurality of said control means connected in parallel with said rectifier means.

7. Apparatus as defined in claim 6 wherein the negative output terminal of said one rectifier means is connected in parallel with each of said plurality of control means, the positive output terminal of the other of said rectifier means being connected in parallel with each of said plurality of control means.

8. Apparatus as defined in claim 1 wherein said means for selectively electrically connecting said terminals with the input means of the control means comprises a switch means supported at said control means and remote from said source of DC electric power.

9. Apparatus as defined in claim 1 wherein said control means includes selectively adjustable resistance means for varying the current output from the control means.

10. Apparatus as defined in claim 1 wherein said source of DC electric power includes a pair of rectifier means each of which has a positive output terminal and a negative output terminal, the positive output terminal of one of said rectifier means and the negative output terminal of the other of said rectifier means being connected with said third terminal which thereby comprises a common terminal adapted to be connected with ground, a plurality of control means, each of said control means including selectively adjustable resistance means for varying the output current from the control means, each control means including a switch means for selectively electrically connecting said terminals with the input means of the control means, the negative output terminal of said one rectifier means being connected in parallel with the switch means of all of said control means, the positive output terminal of the other of said rectifier means being connected in parallel with the switch means of all of said control means.

References Cited
UNITED STATES PATENTS

| | | | |
|---|---|---|---|
| 2,999,970 | 9/1961 | Schwesig et al. | 321—27 |
| 3,247,394 | 4/1966 | Lowrance | 321—27 X |
| 3,278,835 | 10/1966 | Hart | 323—94 |

ROBERT K. SCHAEFER, *Primary Examiner.*

H. J. HOHAUSER, *Assistant Examiner.*

U.S. Cl. X.R.

321—27